United States Patent [19]
Ota et al.

[11] Patent Number: 5,740,459
[45] Date of Patent: Apr. 14, 1998

[54] METHOD AND CIRCUIT FOR SORTING DATA IN A FUZZY INFERENCE DATA PROCESSING SYSTEM

[75] Inventors: Ken Ota, Yokohama, Japan; William C. Archibald, Gillette, Wyo.

[73] Assignee: Motorola, Inc., Schaumburg, Ill.

[21] Appl. No.: 526,331

[22] Filed: Sep. 11, 1995

Related U.S. Application Data

[63] Continuation of Ser. No. 132,614, Oct. 6, 1993, abandoned.

[30] Foreign Application Priority Data

Oct. 7, 1992 [JP] Japan ............... 4-293697

[51] Int. Cl.⁶ ..................................... G06F 15/00
[52] U.S. Cl. ..................... 395/800; 395/3; 395/607
[58] Field of Search ..................... 395/800, 375, 395/3, 607

[56] References Cited

U.S. PATENT DOCUMENTS

| | | | |
|---|---|---|---|
| 4,597,009 | 6/1986 | Ballmer et al. | 348/571 |
| 4,627,024 | 12/1986 | Whalen et al. | 365/189.07 |
| 4,907,187 | 3/1990 | Terada et al. | 395/377 |
| 5,068,822 | 11/1991 | Lawrence | 395/898 |
| 5,278,830 | 1/1994 | Kudo | 370/32 |
| 5,299,318 | 3/1994 | Bernard et al. | 395/572 |
| 5,305,310 | 4/1994 | Itoh et al. | 370/392 |
| 5,305,424 | 4/1994 | Ma et al. | 395/51 |
| 5,398,299 | 3/1995 | Ota et al. | 395/3 |
| 5,410,633 | 4/1995 | Ota et al. | 395/3 |

OTHER PUBLICATIONS

Wayne D. Dettloff et al., "A Fuzzy Logic Controller with Reconfigurable, Cascadable Architecture", 1989, pp. 474-478.

*Primary Examiner*—Alyssa H. Bowler
*Assistant Examiner*—John Follansbee

[57] ABSTRACT

A data sorting circuit comprising: a data bus 1 for sequentially transmitting data to be sorted; a plurality of cascaded data registers (GR) for storing data in magnitude order, each of the data registers being initialized to a predetermined initial value; and a plurality of data transferring means (GS) each associatively provided for each of the data registers respectively, the data transferring means executing one of the following three operations: storing operation which transfers data appearing on the data bus to the associated data register; shifting operation which transfers data stored in the preceding data register to the associated data register; and no operation which does not transfer any data. The data sorting circuit further comprises: a plurality of transfer control circuits (31, 32, 33) each associatively provided for each of the data transferring means respectively, each of the transfer control circuits controlling the operation of the associated data transferring means.

11 Claims, 3 Drawing Sheets

METHOD AND CIRCUIT FOR SORTING DATA IN A FUZZY INFERENCE DATA PROCESSING SYSTEM

This application is a continuation of prior application Ser. No. 08/132,614, filed Oct. 6, 1993 now abandoned.

FIELD OF THE INVENTION

The present invention, in general, to a data sorting circuit. More particularly, the invention relates to a data sorting circuit used in a fuzzy inference system which is utilized for controlling various consumer electronics, automobiles and the like. Such data sorting circuit sorts input label's grades in order to speed up min–max operations performed on the grades in the inference system.

BACKGROUND OF THE INVENTION

It is well known in the art to widely use fuzzy logic control based on fuzzy inference in controlling various consumer electronics, household appliances, automobiles, cameras and the like. In the fuzzy control, in general, if fuzzy conception or fuzzy condition "A" holds well, then control "X" is executed. This proposition is represented by a fuzzy rule "if A then X". More specifically, control "X" is executed in a degree determined by how well a fact indicated by input data conforms to fuzzy conception "A". In this fuzzy rule, A is referred to as "antecedent" and X as "consequent". The degree of conformity of the fact to fuzzy conception A is called "grade". The grade is a function of input data, and needs to be calculated with regard to each fuzzy conception. An input label is used for identifying each input fuzzy conception or condition. Accordingly a fuzzy conception is referred to also as an "input label". An input label membership function defines the relationship between input data and an input label, and is stored in an MF-ROM. A grade calculating circuit is provided in the fuzzy inference system, which calculates input label grades (gi) based on input data (Xi) and input label membership functions. The calculated grades are supplied to a rain-max computing circuit, where min–max operations are performed on the input label grades to compute output label grades. The computed output label grades are then supplied to defuzzification circuit. The final output data are provided from the defuzzification circuit.

In the fuzzy inference system mentioned above, multiple input channels are provided to receive multiple input data such as velocity, pressure and temperature. And multiple input labels are defined in each of the input channels. The system also has multiple output channels to produce multiple output data such as on/off switch signal and valve control signal. And multiple output labels are also defined in each of the output channels. Therefore the total number of the input label grades becomes significantly large, being equal to the number of input channels times the number of input labels per input channel.

Prior art fuzzy control systems have been used mainly in low speed control applications such as home appliances. However, when fuzzy control systems are desired to be used in high speed and relatively complicated control applications such as cruise controls or suspension control of vehicles and the like, computing speed should be significantly improved to typically 1000 times faster than the conventional one. The improvement of the computation speed is achieved by synergistically tuning three computation stages: the grade calculations of input labels, the min–max operations performed on the input label grades to obtain output label grades, and the calculations of center of gravity of output label's membership functions.

Conventional min operations on input label grades have been carried out by comparing each of input label grades with all other input label grades one by one. A typical example of such comparison is Japanese patent laid-open 4-10133 describing comparison achieved by software program. These comparisons by software, however, have difficulty in improving their computing speed because of a large number of magnitude comparisons. Another typical example of comparison achieved by hardware is Japanese patent laid-open 2-159628. This type of solution also has difficulty in improving its execution speed because of a large number of slow comparison circuits needed for respective input labels, and manufacturing cost reduction is also difficult.

The applicant found out that pre-sorting the input label's grades in magnitude order at high speed is effective very much in speeding up the min–max computation on the input label's grades. However, there has existed no data sorting circuit performing at satisfactorily high speed in prior arts as far as the applicant knows.

SUMMARY OF THE INVENTION

Accordingly, it is an object of the present invention to provide an improved data sorting circuit with both fast comparison speed and reduced hardware size. A further object of the present invention is to provide such an improved data sorting circuit used in a fuzzy inference system.

These and other objects and advantages of the present invention are provided by a data sorting circuit comprising: a data bus for sequentially transmitting data to be sorted; a plurality of cascaded data registers for storing data in magnitude order, each of said data registers being initialized to a predetermined initial value; and a plurality of data transferring means each associatively provided for each of said data registers respectively, said data transferring means executing one of the following three operations:

storing operation which transfers data appearing on said data bus to the associated data register;

shifting operation which transfers data stored in the preceding data register to the associated data register; and no operation which does not transfer any data.

The data sorting circuit further comprises: a plurality of transfer control circuits each associatively provided for each of said data transferring means respectively, each of said transfer control circuits controlling the operation of the associated data transferring means. The data transferring means comprises: a comparator for judging the magnitude relationship between data Di stored in the associated data register and data DD appearing on said data bus; and a logic circuit for instructing the associated data transferring means which operation should be executed, based on the combination of the judgment of the associated comparator and the judgment of the comparator in the preceding transfer control circuit.

These and other objects and advantages of the present invention will be apparent from the detailed description below taken together with the drawings.

DETAILED DESCRIPTION OF THE INVENTION

Figure 1:
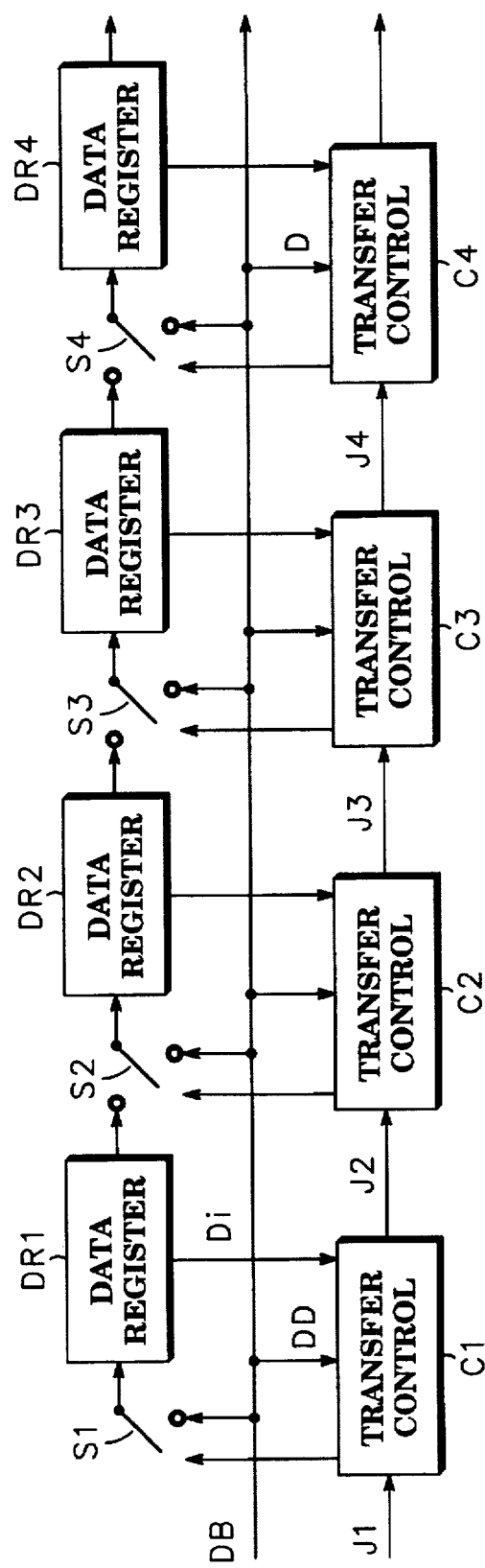
FIG. 1 shows a block diagram of a data sorting circuit according to a preferred embodiment of the present invention.

FIG. 1 is a block diagram of a data sorting circuit according to a preferred embodiment of the present invention. The data sorting circuit includes data bus DB on which data to be sorted appear, cascaded data registers DR1, DR2, DR3 . . . , switches S1, S2, S3 . . . as data transferring means, and transfer control circuits C1, C2, C3 . . . which control the operation of respective switches.

Each of data registers DRi is initialized so as to store an initial value which is larger than the maximum value of data appearing on data bus DB. Each of data transferring switches Si performs one of the following three operations based on instructions from its associated transfer control circuit Ci.

1) storing operation which transfers data DD appearing on data bus DB to its associated data register DRi;

2) shifting operation which transfers data stored in the preceding data register DRi−1 to its associated data register DRi; and 3) no operation which does not transfer any data.

Each of transfer control circuits Ci includes a comparator and a logic circuit (neither is shown in FIG. 1). The comparator compares data Di stored in its associated data register DRi with data DD appearing on data bus DB and judges which is greater. Depending on the combination of the judgment of its associated comparator and the judgment of the comparator in the preceding transfer control circuit Ci−1, the logic circuit instructs transferring switch Si which operation should be performed.

Figure 2A:
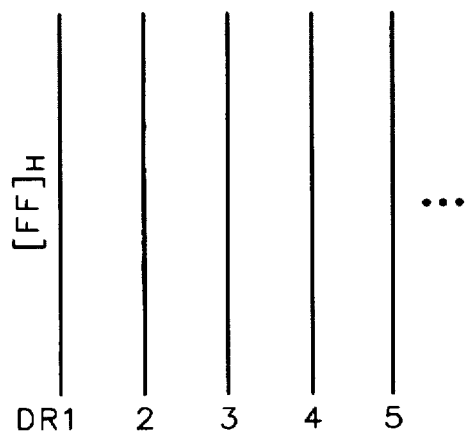
FIG. 2 is a conceptional chart illustrating the operation of the data sorting circuit shown in FIG. 1.
Figure 2Z:
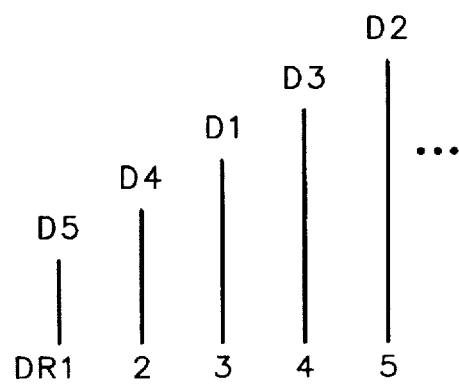

The operation of the data sorting circuit now will be explained in more detail with reference to FIG. 2. Each of data registers DR1, DR2, DR3 . . . is initialized to an initial value as shown in FIG. 2(A). If data appearing on data bus have 8-bit widths, the initial value may be $[FF]_H$. FIG. 2(Z) shows the final status of data registers which finished sorting data D1, D2, D3, . . . which had sequentially appeared on data bus DB.

Figure 2B:
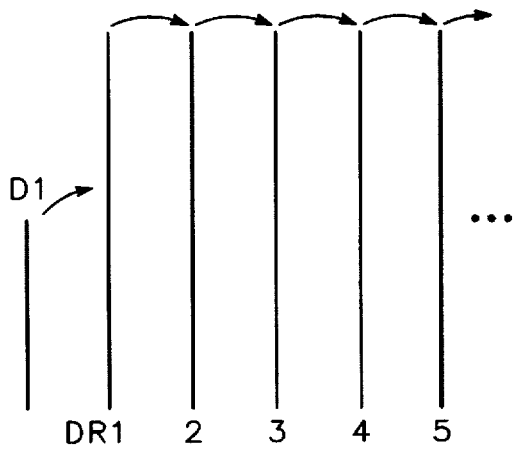

Data D1 appearing first on data bus DB is stored in the first stage data register DR1 as shown in FIG. 2(B), because data D1 is smaller than [FF] stored in data register DR1. At the same time, the initial value [FF] stored in each of data registers DRi is shifted to the subsequent data register DRi+1, because data D1 on data bus DB is smaller than any Di (=FF) stored in every data registers DRi.

Figure 2C:
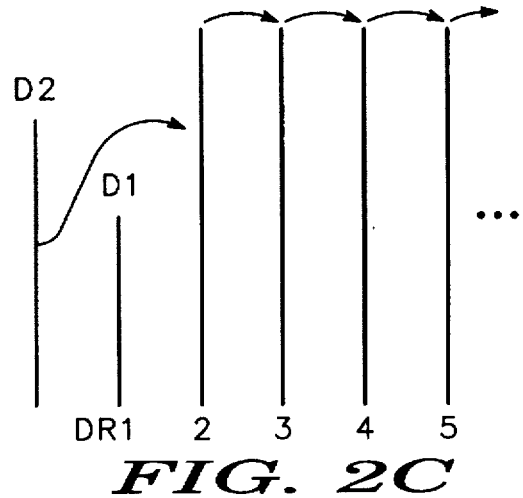

Next, if the second data D2 on data bus DB is greater than D1, D2 is not stored into the first stage data register DR1 having D1 which is smaller than D2. D2 is stored in the second stage data register DR2, because D2 is smaller than [FF] stored in data register DR2 and greater than D1 stored in the preceding data register DR1. At the same time, the initial value [FF] stored in each of data registers DR2, DR3 . . . is shifted to the subsequent data register as shown in FIG. 2(C). These shifting operations are performed in data registers DR3 and the following because D2 is smaller than any Di (i=3, 4, . . . ).

Figure 2D:
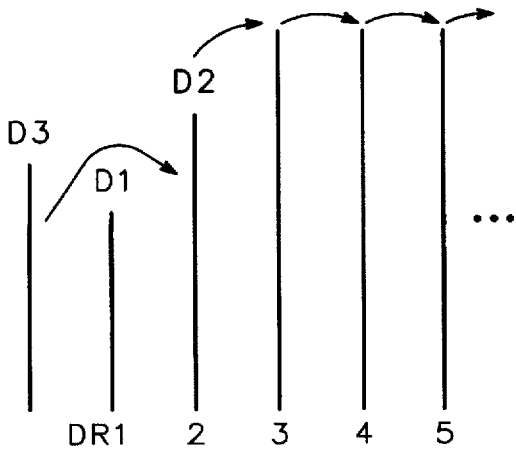
Figure 2E:
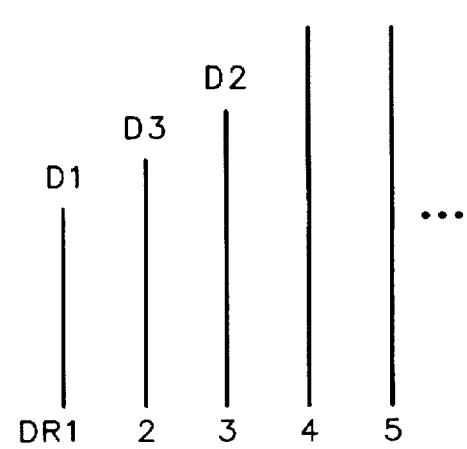

If the third data D3 on data bus DB is greater than D1 but smaller than D2, data D3 is not stored in data register DR1 having D1 which is smaller than D3. Data D3, however, is stored in data register DR2 as shown in FIG. 2(D), because D3 is smaller than data D2 stored in data register DR2. At the same time, data stored in data registers DRi (i=2, 3, 4 . . . ) are shifted to the subsequent data registers DRi+1 respectively, because magnitude relationships of data D3 and data stored in DRi+1 are the same in these data registers DRi (i=2, 3, 4 . . . ). As a result, data D1, D2 and D3 are sorted in their magnitude order in data registers DR1, DR2 and DR3 as shown in FIG. 2(E).

The above mentioned operation is repeatedly performed whenever data appear on data bus DB. In this manner all data may be sorted in their magnitude order in data registers DRi as shown in FIG. 2(Z).

Figure 3:
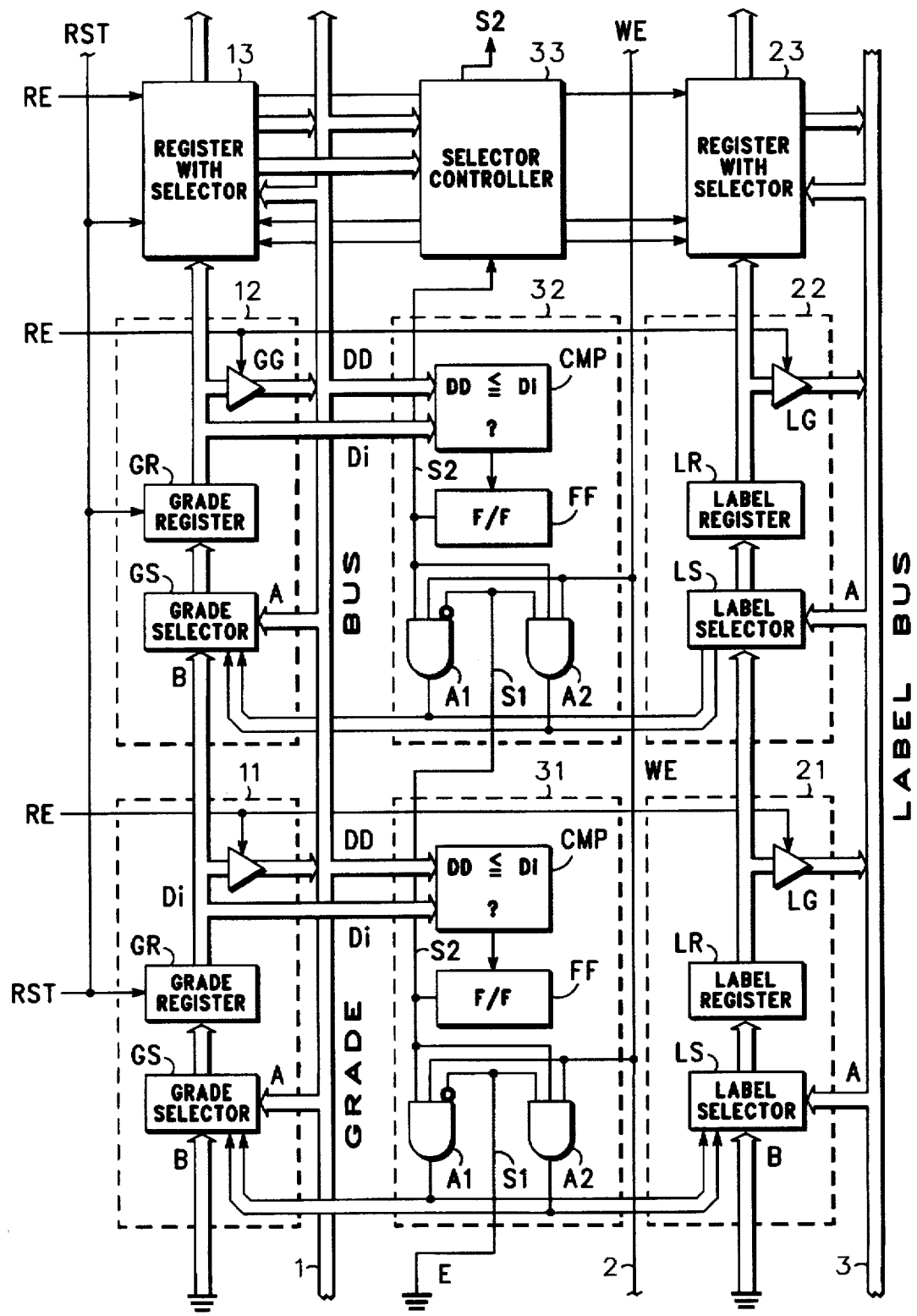
FIG. 3 is a detailed block diagram illustrating the data sorting circuit shown in FIG. 1.

FIG. 3 is a detailed block diagram illustrating the data sorting circuit shown in FIG. 1. The data sorting circuit includes a grade bus 1 transmitting input label's grades outputted from a preceding grade estimator (not shown), a label bus 3 transmitting input label (code) associated with the grade simultaneously appearing on grade bus 1, and a write enable (WE) signal line 2, on which a logically high level signal appears only when an input label's grade on data bus is non-zero.

The data sorting circuit also includes a group of cascaded registers 11, 12, 13, . . . and 21, 22, 23, . . . each of which has a 2-input selector at its input, and a group of cascaded selector controllers 31, 32, 33, . . . each of which controls the selecting operation of its associated selector.

More specifically each of registers 11, 12, 13, . . . comprises a grade register GR and a 2-input grade selector GS placed at the input of grade register GR. One input A of grade selector GS is connected to grade bus 1 and the other input B is connected to the output of the preceding stage grade register GR. The output of grade selector GS is connected to its associated grade register GR.

Each of registers 21, 22, 23, . . . comprises a label register LR and a 2-input label selector LS placed at the input of label register LR. One input A of label selector LS is connected to label bus 3 and the other input B is connected to the output of the preceding stage label register LR. The output of label selector LS is connected to its associated label register LR.

The data sorting circuit further includes a group of cascaded selector controllers 31, 32, 33, . . . , each of which is connected between its associated grade selector GS and label selector LS. Each of selector controller comprises a comparator CMP performing magnitude comparison between grade Di stored in its associated grade register GR and data DD appearing on grade bus 1, a D-type flip-flop FF storing the comparison result of comparator CMP, and a logic circuit including a pair of AND gates A1 and A2. Comparator CMP belonging to each stage controller outputs High to flip-flop FF when DD≦Di.

Before input label's grades appear on grade bus 1, grade register GR of each stage register 11, 12, 13, . . . is initialized to a initial value by a reset signal supplied from a signal line RST. The initial value may be $[FF]_H$ if input label's grades have 8-bit widths.

After the resetting grade registers GR, a grade estimator (not shown) in the preceding stage sequentially outputs input label's grades onto grade bus 1 and its associated input label codes onto label bus 3. Only when a current grade appearing on grade bus 1 is a valid data with non-zero value, the grade estimator also outputs onto line 2 a write enable signal (WE) which allows latching the current appearing grade.

When the first non-zero grade DD1 appears on grade bus 1 at the timing of rising edge of clock signal (not shown), comparator CMP in each of selector controllers 31, 32, 33, . . . compares grade DD1 with grade Di (=FF) stored in its associated grade register GR. Comparator CMP in every stage outputs High level signal because DD1 is smaller than the stored initial value [FF]. The D-type flipflop FF in each stage latches the High level signal at the timing of falling edge of the clock signal, outputting High level onto a signal line S2 to notify the subsequent stage that the comparison result of its own stage was DD1≦Di.

In every selector controller other than the first stage selector controller, the above described signal S2 is received by logic circuit A1 and A2 as a signal S1. The first stage selector controller 31 receives a constant Low level signal on signal line S1 because there is no preceding stage.

Therefore, in case of the comparison result DD1≦Di, the outputs of the first stage AND gates A1 and A2 are H and L respectively. The associated grade selector GS receiving the combination (H, L) connects grade bus 1 to its associated grade register GR at the rising edge of the clock signal, thus the first grade DD1 appeared on grade bus 1 is transferred to the first stage grade register GR.

On the other hand, in each of the second stage and the following selector controllers 32, 33, 34, . . . AND gates A1 and A2 output Low and High respectively, because the High level signal from the proceeding stage exists on signal line S1. The associated grade selector GS receiving the combination (L, H) connects the preceding grade register GR to its associated grade register GR at the falling edge of the clock signal. Thus, the initial value [FF] stored in each of the preceding registers 11, 12, 13, . . . is shifted out to the subsequent registers 12, 13, 14, . . . .

When the second non-zero grade DD2 appears on grade bus 1, either one of two different data transferring operation takes place depending upon the comparison result between DD2 and DD1. The case of DD2≦DD1 is described first below.

The first stage selector controller 31 compares new grade DD2 with grade DD1 stored in its associated grade register GR. In this case, the fact DD2≦DD1 causes the associated grade selector GS to perform a similar operation to the DD1's case and new grade DD2 is stored into grade register GR in register 11 at the falling edge of the clock signal.

In each of the second stage and the following selector controllers 32, 33, 34, . . . AND gates A1 and A2 output (L, H) respectively. Thus data DD1 and the initial value [FF] stored in grade registers GR 11, 12, 13, . . . are shifted to the subsequent registers respectively at the falling edge of the clock signal, in a similar manner to the case of storing DD1.

As a result, the first stage grade register GR of register 11 stores grade DD2, and the second stage grade register GR of register 12 stores grade DD1. The third stage and the following grade registers GR of registers 13, 14, . . . store the initial values [FF].

Next, the case of DD2>DD1 is described below. In this case, the first stage comparator CMP in selector controller 31 outputs Low level signal and the output combination of AND gates A1 and A2 becomes (L, L). The first stage grade selector GS of register 11 does not connect either input terminal A or B to its associated grade register GR. Thus, the first stage grade register GR of register 11 maintains grade DD1 stored previously.

While, the second stage comparator CMP in selector controller 32 outputs High level, because its associated grade register holds the maximum value [FF]. On the other hand, the comparison result of the first stage selector controller 31 outputs Low level on signal line S2. Thus the combination of the second stage AND gates A1 and A2 becomes (H, L). The second stage grade selector GS of register 12 connects grade bus 1 to its associated grade register GR. As a result, the second stage grade register GR stores current grade DD2 (>DD1).

In the third stage and the following stages, the comparison results of selector controllers 33, 34, . . . are High levels and the preceding stage's comparison results are also High levels. Thus, the combination of AND gates A1 and A2 becomes (L, H). As a result, registers 13, 14, . . . receive the initial values [FF] shifted out from the preceding registers 12, 13, . . . .

As described above, the first stage grade register GR of register 11 stores the smaller one of grade DD1 and DD2. The larger one is stored in the second stage grade register GR of register 12.

The data transferring operations described above are summarized as follows:

A. The first stage selector controller

A1) transfers a current appearing grade from grade bus 1 to its associated grade register if the current grade is equal to or less than the grade already stored in the associated grade register; or A2) performs no data transfer to its associated grade register if a current grade on grade bus 1 is greater than the grade already stored in the associated grade register.

B. Each of the second stage and the following selector controllers

B1) shifts the grade stored in the preceding grade register to its associated grade register if a current grade appearing on grade bus 1 is equal to or less than both of the grades stored in its associated and the preceding grade registers;

B2) transfers a current appearing grade from grade bus 1 to its associated grade register if the current grade is greater than the grade stored in the preceding stage's grade register but equal to or less than the grade stored in its associated stage's grade register; or B3) performs no data transfer and maintains the grade previously stored in its associated stage's grade register if a current grade appearing on grade bus 1 is greater than the grade stored in the associated grade register.

Cascaded registers 21, 22, 23, . . . provided corresponding to registers 11, 12, 13, . . . perform similar operations to the registers 11, 12, 13, . . . according to control signals from corresponding selector controllers 31, 32, 33, . . . . Thus, input label codes sequentially appearing on label bus 3 simultaneously with the corresponding grades on grade bus 1, are stored in label registers LR corresponding to grade registers GR.

If membership functions for input labels included in input data channels of fuzzy inference are defined such that only neighboring two membership functions can cross each other, then at most two non-zero grades can be outputted from each of input data channels. Therefore, by choosing the numbers of registers' stages to be equal to two times of the number of input data channels, all of non-zero grades can be sorted in grade registers GR.

Each of input label's grades thus sorted in magnitude order is outputted from each grade register GR onto grade bus 1 through each gate GG under control of each associated read enable signal RE, and is supplied to a min-max computing circuit in a fuzzy inference system (not shown). Synchronizing to the outputting operation of grades, the corresponding label codes are also outputted from each label code register LR onto label bus 3 through each gate LG under control of each associated read enable signal RE. Thus the min-max computing circuit can utilized the sorted grades and their input labels in performing min-mas computation at very much high speed.

The initial value for grade registers GR may be a threshold value which is smaller than the maximum of grade data, and grade data greater than the threshold value can be withdrawn. Sorting order may be increasing or decreasing order. The number of register stages may be less than the number of data to be sorted, and some uppermost or lowermost data can be withdrawn by shifting out.

While the present invention has been shown and described with reference to a particular embodiment thereof, various modifications and changes thereto will be apparent to one skilled in the art and are within the spirit and scope of the present invention.

We claim:

1. A data processing system, comprising:
   a first data bus for transmitting a first plurality of data values to be sorted;
   a second data bus for transmitting a second plurality of data values to be sorted;
   a first plurality of cascaded data registers coupled to the first data bus for selectively storing a first one of the first plurality of data values, selectively shifting a corresponding one of a first plurality of stored data values to a subsequent one of the first plurality of data registers, and selectively not executing one of a storage and a shifting operation in response to a corresponding one of a plurality of selector control signals, wherein each of the first plurality of cascaded data registers comprises:
   a first selector circuit coupled to the logic means for receiving a transfer control signal, coupled to the first data bus, and coupled to a third data bus; and
   a first data register having an input coupled to the first selector circuit and an output coupled to a first subsequent selector circuit of the subsequent one of the first plurality of cascaded data registers;
   a second plurality of cascaded data registers coupled to the second data bus for selectively storing a first one of the second plurality of data values, selectively shifting a corresponding one of a second plurality of stored data value to a subsequent one of the second plurality of data registers, and selectively not executing one of a storage and a shifting operation in response to the corresponding one of the plurality of selector control signals, wherein each of the second plurality of cascaded data registers comprises:
   a second selector circuit coupled to the logic means for receiving a transfer control signal, coupled to the second data bus, and coupled to a fourth data bus; and
   a second data register having an input coupled to the second selector circuit and an output coupled to a second subsequent selector circuit of the subsequent one of the second plurality of cascaded data registers; and
   a plurality of selector controllers coupled to a corresponding one of the first plurality of cascaded data registers for receiving the corresponding one of the first plurality of stored data values, coupled to the first data bus for receiving the first plurality of data values, and each of the plurality of selector controllers coupled to a corresponding one of the second plurality of cascaded data registers for receiving the corresponding one of the plurality of selector control signals, a first one of the plurality of selector controllers comparing each of the corresponding ones of the first plurality of stored data values and fie first plurality of data values to provide the plurality of selector control signals, wherein each of the plurality of selector controllers comprises:
   a comparator for comparing a first value of the first plurality of data values and a first corresponding one of the first plurality of stored data values, the comparator providing a comparison signal;
   a latch coupled to the comparator for storing the comparison signal, the latch providing a delayed signal; and
   logic means coupled to the latch for receiving the delayed signal, a write enable signal, and a history signal, the logic means providing a corresponding one of the plurality of selector control signals;
   wherein the second selector circuit selectively provides a first one of the second plurality of data values to the second data register when the corresponding one of the plurality of selector control signals indicates the first one of the first plurality of data values is less than the first corresponding one of the first plurality of stored data values; and
   wherein the second data register shifts a value stored therein to the second subsequent selector circuit using the fourth data bus when the first one of the second plurality of data values is stored in the first one of the second plurality of data registers.

2. The data processing system of claim 1 wherein the first data bus communicates a plurality of grade values for use in a fuzzy inference system and the second data bus communicates a plurality of label values for use in the fuzzy inference system.

3. The data processing system of claim 1 wherein the each of the first plurality of data values corresponds to one of the second plurality of data values.

4. The data processing system of claim 1 wherein a first one of the first plurality of cascaded data registers stores the first one of the first plurality of data values when the corresponding one of the plurality of selector control signals indicates the first one of the first plurality of data values is less than the corresponding one of the first plurality of stored data values.

5. The data processing system of claim 4 wherein the corresponding one of the first plurality of stored data values is shifted to the subsequent one of the first plurality of cascaded data registers when the first one of the first plurality of data values is stored in the first one of the first plurality of data registers.

6. The data processing system of claim 4 wherein a first one of the second plurality of cascaded data registers stores the first one of the second plurality of data values when the corresponding one of the plurality of selector control signals indicates the first one of the first plurality of data values is less than the corresponding one of the first plurality of stored data values.

7. The data processing system of claim 6 wherein a corresponding one of the second plurality of stored data values is shifted to the subsequent one of the second plurality of cascaded data registers when the first one of the first plurality of data values is stored in the first one of the first plurality of data registers.

8. The data processing system of claim 1 wherein each of the plurality of selector controllers comprises:
   a comparator for comparing a first one of the first plurality of data values and a first corresponding one of the first plurality of stored data values, the comparator providing a comparison signal;
   a latch coupled to the comparator for storing the comparison signal, the latch providing a delayed signal; and
   logic means coupled to the latch for receiving the delayed signal, a write enable signal, and a history signal, the logic means providing a corresponding one of the plurality of selector control signals.

9. The data processing system of claim 1 wherein the first selector circuit selectively provides the first one of the first plurality of data values when the corresponding one of the plurality of selector control signals indicates the first one of the first plurality of data values is less than the corresponding one of the first plurality of stored data values.

10. The data processing system of claim 9 wherein the first data register shifts a value stored therein to the subsequent selector circuit using the third data bus when the first one of the first plurality of data values is stored in the first one of the first plurality of data registers.

11. A data processing system, comprising:
a first data bus for transmitting a first plurality of data values to be sorted;
a second data bus for transmitting a second plurality of data values to be sorted;
a first plurality of cascaded data registers coupled to the first data bus for selectively storing a first one of the first plurality of data values, selectively shifting a corresponding one of a first plurality of stored data values to a subsequent one of the first plurality of data registers, and selectively not executing one of a storage and a shifting operation in response to a corresponding one of a plurality of selector control signals, each of the first plurality of cascaded data registers comprising:
a first selector circuit coupled to the logic means for receiving a transfer control signal, coupled to the first data bus, and coupled to a third data bus; and
a first data register having an input coupled to the first selector circuit and an output coupled to a first subsequent selector circuit of the subsequent one of the first plurality of cascaded data registers;
a second plurality of cascaded data registers coupled to the second data bus for selectively storing a first one of the second plurality of data values, selectively shifting a corresponding one of a second plurality of stored data value to a subsequent one of the second plurality of data registers, and selectively not executing one of a storage and a shifting operation in response to the corresponding one of the plurality of selector control signals, wherein each of the second plurality of cascaded data registers comprises:
a second selector circuit coupled to the logic means for receiving a transfer control signal, coupled to the second data bus, and coupled to a fourth data bus; and
a second data register having an input coupled to the second selector circuit and an output coupled to a second subsequent selector circuit of the subsequent one of the second plurality of cascaded data registers,
the second selector circuit selectively providing a first_ one of the second plurality of data values to the second data register when the corresponding one of the plurality of selector control signals indicates the first one of the first plurality of data values is less than the first corresponding one of the first plurality of stored data values and the second data register shifting a value stored therein to the second subsequent selector circuit using the fourth data bus when the first_one of the second plurality of data values is stored in the first one of the second plurality of data registers; and
a plurality of selector controllers coupled to a corresponding one of the first plurality of cascaded data registers for receiving the corresponding one of the first plurality of stored data values, coupled to the first data bus for receiving the first plurality of data values, and each of the plurality of selector controllers coupled to a corresponding one of the second plurality of cascaded data registers for receiving the corresponding one of the plurality of selector control signals, a first one of the plurality of selector controllers comparing each of the corresponding ones of the first plurality of stored data values and the first plurality of data values to provide the plurality of selector control signals.

\* \* \* \* \*